United States Patent [19]
Muzzy

[11] Patent Number: 5,302,419
[45] Date of Patent: Apr. 12, 1994

[54] TOWPREGS FROM RECYCLED PLASTICS BY POWDER FUSION COATING AND METHOD OF PRODUCTION THEREFOR

[75] Inventor: John D. Muzzy, Atlanta, Ga.

[73] Assignee: Georgia Tech Research Corporation, Atlanta, Ga.

[21] Appl. No.: 848,119

[22] Filed: Mar. 9, 1992

Related U.S. Application Data

[63] Continuation-in-part of Ser. No. 339,297, Apr. 17, 1989, Pat. No. 5,094,883, and a continuation-in-part of Ser. No. 700,559, May 15, 1991, Pat. No. 5,171,630.

[51] Int. Cl.$^5$ ............................................. B05D 1/00
[52] U.S. Cl. ................................... 427/485; 427/209; 427/211; 427/374.1; 427/486; 427/185
[58] Field of Search .............. 264/348, 136, 237, 280; 427/209, 211, 185, 485, 486, 374.1; 428/903.3

[56] References Cited

U.S. PATENT DOCUMENTS

| | | | |
|---|---|---|---|
| 4,714,642 | 12/1987 | McAliley et al. ................... | 428/299 |
| 4,804,509 | 2/1989 | Angell et al. ........................ | 427/211 |
| 5,073,416 | 12/1991 | Arokian et al. ..................... | 156/62.2 |

Primary Examiner—James J. Bell
Attorney, Agent, or Firm—Deveau, Colton & Marquis

[57] ABSTRACT

An improved flexible towpreg article and a method of production therefor. The improved flexible towpreg article comprises a prepreg which comprises reinforcing filaments and matrix forming material comprising recycled plastics; the reinforcing filaments being substantially wetout by the matrix forming material such that the towpreg plies have a low void content compared to the multiply towpreg. The method of production for the improved flexible towpreg article includes the steps of spreading the reinforcing filaments; coating the reinforcing filaments with the matrix forming material in a manner causing interfacial adhesion of the matrix forming material to the reinforcing filaments; forming the prepreg by heating the matrix forming material contacting the reinforcing filaments until the matrix forming material liquefies and coats the reinforcing filaments; and cooling the prepregs in a manner such that substantial cohesion between neighboring towpreg plies is prevented until the matrix forming material solidifies.

21 Claims, 4 Drawing Sheets

TOWPREGS FROM RECYCLED PLASTICS BY POWDER FUSION COATING AND METHOD OF PRODUCTION THEREFOR

STATEMENT OF RELATED APPLICATIONS

This application is a continuation-in-part of application Ser. No. 07/339,297 filed on Apr. 17, 1989, now U.S. Pat. No. 5,094,883 and application Ser. No. 07/700,559, filed on May 15, 1991 now U.S. Pat. No. 5,171,630.

BACKGROUND OF THE INVENTION

1. Field of the Invention

The present invention is directed to towpregs and a method of production therefor and, more specifically, towpregs comprising continuous fibers or filaments combined with a matrix resin comprising, in part, recycled plastics, and a method for producing such towpregs.

2. Discussion of the Prior Art

Towpregs comprising fibers or filaments combined with a matrix resin are known in the art and typically are called "prepregs". Conventional prepreg consists of hundreds or thousands of fibers or filaments embedded in a continuous mass of matrix. The reinforcing fibers typically used are available commercially in continuous form in "bundles" of filaments known as "tows", which vary widely in number of filaments per tow. Many matrix resins are available, however two kinds of matrix resin systems dominate the prior art: thermoplastic and partially cured thermoset polymers. Towpregs are one form of prepreg.

Thermoplastic polymers have been widely used as matrices for towpregs and other composites, and are potentially useful as matrices for advanced composites for aerospace applications. Thermoplastics have advantages over thermosetting materials in fracture toughness, impact strength and environmental resistance. Thermoplastics also provide prepregs with indefinite shelf life, give the fabricator better quality assurance and avoids the storage and refrigeration problem associated with thermosetting prepreg. Thermoplastic molecules can be tougher than the rigid cross-linked network of the thermosets; few of the toughened thermosets have met the combined requirements of damage tolerance and hot/wet compression strength necessary for use in aerospace composites. The disadvantage of thermoplastic polymers as a matrix material is the difficulty of uniformly coating the fibers due to the high viscosity of the molten polymer. Thermoplastic prepregs also typically are rigid and are not well-suited for weaving or braiding, as the resulting fabrics are stiff. Similarly, the rigidity of thermoplastic coated prepregs complicates the formation of complex shapes; heat must be focused at the point of contact to achieve conformability during layup.

Thermoset polymers also are used as towpreg matrix materials. Prepregs containing thermosetting prepolymers, although relatively flexible, may be tacky, thus requiring a protective release coating which must be removed prior to use. While thermoset prepregs are acceptable for many applications, their tackiness and the requirement of a protective release coating make thermoset prepregs unfeasible for weaving and braiding.

Two other types of towpreg are metal matrix towpreg, which is similar to thermoplastic towpreg, and partially cured ceramic towpreg, which is similar to thermoset towpreg. However, due to the limited markets for metal and ceramic towpregs and composites, these materials are not generally available and have not been the focus of developments in manufacturing technology. Metal and ceramic matrix towpregs can be manufactured in a manner and form analogous to thermoplastic and thermosetting towpregs.

Continuous fiber prepregs can be produced by a number of impregnation methods including hot melt, solution, emulsion, slurry, surface polymerization, fiber commingling, film interleaving, electroplating, and dry powder techniques.

In hot melt processing, impregnation may be accomplished by forcing the fiber and resin through a die at high temperature under conditions that create high shear rates. Due to the high temperatures of this process, the thermoplastic material can degrade. Other disadvantages of this process include the high stress applied to the fibers and difficulties in impregnating the fiber tows with thermoplastics.

In solution coating, the matrix material is dissolved in solvent and the fiber is passed through this solution and then dried to evaporate the solvent. Two disadvantages associated with this process is that thermoplastics usually exhibit limited solubility at high concentration, and most engineering thermoplastics cannot be dissolved in a low boiling solvent at room temperature. Additionally, high solution viscosity results in the same impregnation problems as with hot melt, as well as causing the fiber to stick together. Another problem is the difficulty in removing the solvent. Further, traces of solvent left in the prepreg lead to undesirable porosity in the composite structures.

An emulsion process is one way to apply particulate polymer matrix material with a very small particle size to towpreg fiber by synthesizing the resin as an aqueous emulsion with a surfactant. The problem with this process is that the removal of the surfactant from the final towpreg is difficult.

Slurry coating or wet powder processing is a non-solvent coating technique designed to resolve the problem of the insolubility of most thermoplastics in a solvent at room temperature. In slurry coating, the powder is suspended in a liquid medium, generally water, wherein no solvency exists between the resin and the medium, and the fibers are drawn through the slurry. The slurried particulate matrix does not wetout the fiber, resulting in the need for higher pressures to consolidate the matrix and fibers into a prepreg. This prepreg can be tacky, which is not suitable for weaving or braiding. Other disadvantages include the necessity for the removal of the liquid medium, volatiles, and dispersants or surfactants which are used to form the polymer/liquid colloidal state, the likelihood of aggregates in the slurry caused by poor mixing, and the possibility that polymer particles will settle during processing.

To achieve intimate mixing in emulsion or slurry coating, the particle size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated towpreg, and poor composite structure.

In surface polymerization, coating results from the polymerization of the polymer matrix on the fiber substrate. Disadvantages associated with this process include the need to remove undesired materials, such as solvent, inhibitor, or by-products of the polymerization reactions. Surface polymerization can be only conducted by special techniques, such as electropolymerization, which cannot be used to produce many of the polymeric matrices of commercial interest.

In fiber commingling, the polymeric matrix is introduced in fibrous form. Polymeric and reinforcing fibers are mingled as dry blends; however, wetting of the fiber by a process such as melting the polymer fiber is deterred until the towpreg is consolidated. Effective impregnation depends on the degree of randomness of the intermingling of the resin and fiber throughout the system. Since no wetting of the reinforcing fibers by the matrix material occurs in this situation, higher pressures are needed to consolidate the towpreg under equivalent processing times and temperatures, as compared to completely wetted towpregs.

Film casting is one method for producing prepreg which resolves some of the problems associated with hot melt impregnation of thermoplastics. It consists of stacking a film layer of matrix material cast from either hot melt or solution over the towpreg fibers. The fibers sandwiched between two films are heated and calendered to force the resin into the fibers.

With regard to towpregs, a flexible metal matrix towpreg has been produced by electroplating by American Cyanamid. Each fiber is completely wet-out and uniformly coated with the metal matrix. This towpreg has desirable properties for weaving, braiding, filament winding, or for conversion to bulk or sheet molding compound feedstocks. Additionally, this towpreg does not require high pressure for consolidation. However, electroplating has a disadvantage in that systems that can be adapted to electroplating are limited. Most ceramic and polymeric matrices of commercial interest cannot be electroplated on reinforcing fibers. Since the filaments or fibers comprise one of the electrodes, the reinforcing fiber must be conductive and fibers, such as glass fibers and organic fibers, cannot be electroplated.

Powder coating of fibers is the most recent method developed for making prepreg. The significant advantages are that no solvent is required and no high stress is introduced in the process. The ultimate goal for almost all powder coating applications is the ability to deposit a thin, even thickness, high quality coating as efficiently as possible. The powdered resin also must be solid at ambient and elevated storage temperatures, and be capable of melting sharply to low viscosity to permit flow and to penetrate the fiber tow when heated. Dry powder coating has many advantages because the elimination of a wet base, solvent or water, facilitates reclamation of the coating material. This is an important economic advantage which promises a potential 100% utilization of powder plus elimination of expensive solvents that are flushed off and inevitably wasted. Thus, powder coating was conceived and has grown largely on these potential benefits.

Another method of powder coating fibers with matrix is the ATOCHEM method of impregnating fibers with dry thermoplastic polymer powder and then covering the coated fibers with a thermoplastic sheath. However, as the matrix is not melted onto the fibers, only fibers in contact with the sheath are wetted with the matrix. Consolidating this towpreg also requires higher pressures under comparable processing conditions than completely wetout towpreg. Furthermore, as in slurry coating, a fine polymer powder, generally less than 20 microns, is recommended for this process. Producing such fine powder from thermoplastics can be very expensive.

Intermediate composite products, such as towpreg, must contain sufficient matrix, typically over 25% by volume, to permit consolidation of the components into a substantially void-free towpreg structure without requiring the incorporation of more matrix material. Linear towpregs can be converted into two and three dimensional product forms by weaving, braiding, filament winding, and other known processes. Alternatively, these towpregs can be used to create a discontinuous fiber reinforced feedstock for molding by chopping, cutting, or like known processes.

BRIEF SUMMARY OF THE INVENTION

The flexible towpreg according to the present invention, is produced by a three-step process: (1) The substrate of reinforcing fibers or filaments is spread to expose virtually all of the fibers or filaments to the environment; (2) the matrix material is contacted with the exposed spread fibers or filaments in a manner causing interfacial adhesion; and (3) substantial cohesion between neighboring fibers or filaments is prevented by keeping the substrate laterally separated until the matrix material solidifies into a non-tacky state.

The matrix material used comprises substantially recycled waste plastic, but may contain virgin plastic. Although all types of plastic may be used as the matrix material, thermoplastics are preferred. Plastic to be recycled is first chopped and then ground to provide a powder. This powder can be partially purified by density separation if the source of the recycled waste plastic is a mixed plastic waste. The powder is applied and fused to a substrate of reinforcing fibers to produce a prepreg. Composite structures are fabricated from this prepreg in the same manner as conventional prepreg.

The substrate preferably are reinforcing fibers, in various forms, such as a woven web, a textile fabric or a fiber tow. The reinforcing fibers can be coated as a textile fabric as well as a spread tow. If a tow is used, towpreg plies typically are produced which are suitable for weaving, braiding, filament winding and the like. A towpreg ply is a separate section of towpreg which is relatively free of voids and separated from neighboring plys for an average axial length of at least about 30 times the thickness of the ply. This geometric separation of non-tacky plies leads to substantially independent flexural deformation of the ply elements.

The towpregs of the present invention typically have a minimum bending radius of no greater than about 15 mm and are suitable for fabric applications. Towpregs produced by the present invention typically have an average ply thickness which does not exceed about 100 microns. Although the ply thickness may be limited by the above requirements to be useful in weaving and braiding, it is not necessary to constrain the size of the towpreg provided the plies comprising the towpreg can act independently.

The primary object of this invention is to provide a towpreg comprising substrate fibers or filaments coated with a matrix material which uses as a primary matrix material recycled plastics.

Another object of this invention is to provide a towpreg suitable for conversion into sheets of bulk molding compound feedstock.

A further object of this invention is the production of commercially feasible towpregs from a variety of fibers partially impregnated with a recycled plastic matrix material.

Yet another object of this invention is to provide towpregs containing a sufficient number of filaments to be suitable for the economic production of composite structures.

An additional object of this invention is to provide towpregs with the reinforcing fibers sufficiently wetout that excessive pressure is not required to complete fiber wetout during the consolidation of the towpreg.

Another object of this invention is to permit production of towpregs starting with the matrix material in the form of inexpensive waste plastics.

An additional object of this invention is to provide a method for producing towpregs which uses a matrix material which minimizes harm to be processing equipment or the end product.

A final object of this invention is to provide towpregs which can be produced from a somewhat mixed or contaminated matrix material source which does not need to be purified but which still results in a composite with satisfactory properties.

These objects and others that will become apparent to one skilled in the art are achieved by the present invention as more fully described by the drawings and the detailed description of the invention below.

DETAILED DESCRIPTION OF THE DRAWINGS

FIG. 3 is a comparison of representations of conventional towpreg (FIG. 3a) and towpreg produced from the present invention (FIG. 3b).

FIG. 4 is a representation of tow plies produced from the present invention after solidification of the matrix forming material on the reinforcing filaments prior to gathering (FIG. 4a) and after gathering (FIG. 4b).

FIG. 5 is a representation of the process of melting the matrix forming material onto the reinforcing filaments of the present invention with lateral constraint (FIGS. 5a–5h) and without lateral constraint (FIGS. 5i–5n) and a section of the neck of matrix forming material between filaments (FIG. 5c).

DETAILED DESCRIPTION OF THE INVENTION

1 General

An important feature of this invention is the promotion of fiber or filament wetting or wet-out, by the recycled plastic matrix material while minimizing the coalescence between wetted neighboring filaments. To prevent coalescence between coated filaments it is necessary to keep the filaments as separated as possible until the matrix solidifies. One approach to keep the filaments separated is by restraining the lateral contraction of the filaments by maintaining an axial tension on the filaments. FIG. 5 illustrates the melting of a recycled plastic powder particle onto two filaments.

Figure 5A:
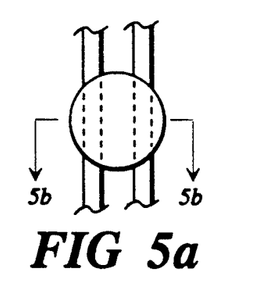
Figure 5B:
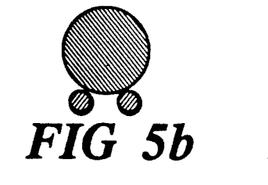
Figure 5C:
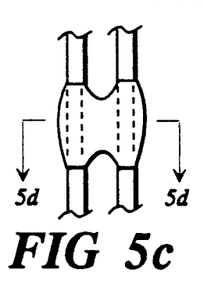
Figure 5D:
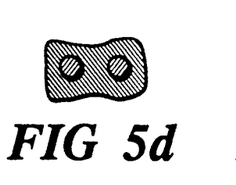
Figures 5E, 5G:
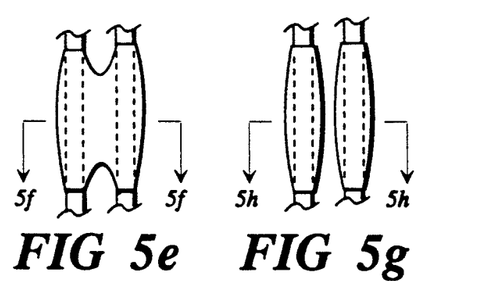
Figure 5F:
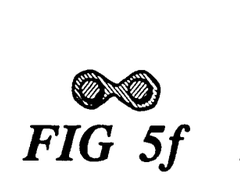
Figure 5H:
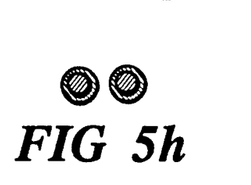
Figure 5I:
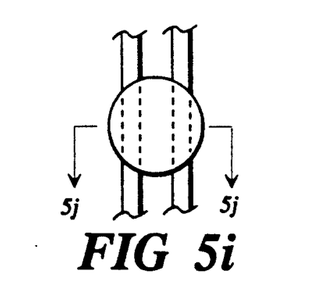
Figure 5J:
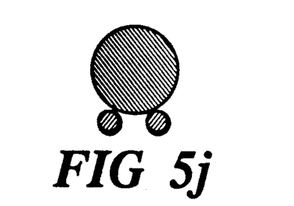
Figure 5K:
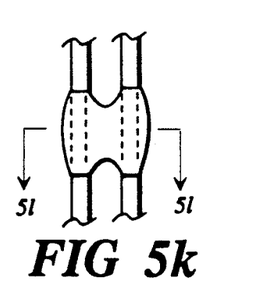
Figure 5L:
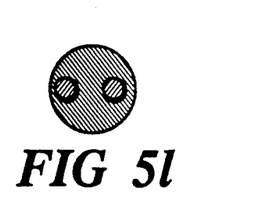
Figure 5M:
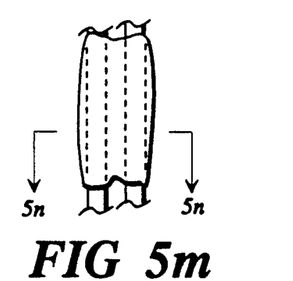
Figure 5N:
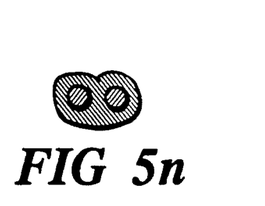

In FIG. 5a–5n, a high axial tension constrains the filaments from approaching each other. In FIGS. 5i–5n, the axial tension on the filaments is low; hence, the filaments can approach each other laterally as the particle melts and wicks along the filaments.

In FIGS. 5m–5n, the thickness of the melt between the two filaments is large even after the filaments are substantially wetted. By comparison, in FIG. 5e–5f the thickness of the melt between the two filaments is substantially thinner than in FIG. 5m–5n due to constraining the lateral movement of the filaments. Consequently, it is easy to separate the two coated filaments by fracturing the thin film between the two filaments. The result of this separation process is shown in FIG. 5g–5h.

Due to constraining the filaments a tensile stress develops normal to the filament axis in the necked down melt between the filaments. This condition is illustrated in FIG. 5c. This tensile stress develops because material is drawn away from this interfilamentary area in order to spread along the filaments. The neck will fracture if this state of stress, $\sigma_N$, exceeds the failure stress, $\sigma_f$, for the melt. The failure stress of the matrix can be used as a guide to determine suitable operating conditions for a particular matrix. For example, it is well known that low molecular weight molten materials have virtually negligible tensile failure stresses. It is also known that high molecular weight molten polymers lose strength as the operating temperature is increased. Similarly, partially solvated or plasticized polymers have lower tensile strength than neat polymer.

The thinness of the spread fiber substrate makes it possible to melt the polymer in a very short time period, and the polymer can be raised well above the normal safe temperature for the melt. In this manner, an extremely low elastic strength in the melt can be achieved. Conventional matrix forming material systems may operate at a temperature at or slightly above the melting temperature of the particular matrix forming material. The coating system of the present invention can operate at a temperature significantly higher than the softening temperature of the particular matrix forming material, and generally can operate at a temperature as high as the particular matrix forming material will take without incurring degrading reaction or resin advancement during the residence time within the system. The residence times used in this invention can be short enough such that no matrix forming material degradation or resin advancement is apparent. The temperature at which the oven operates is related to the residence time of the substrate/matrix material in the oven—high temperatures can be used if residence time is reduced, and vice versa. In this manner, temperatures higher that the temperature at which the matrix material incurs degrading reaction or resin advancement occurs can be used, so long as the residence time is sufficiently short such that the matrix material does not reach such a temperature at which the matrix material incurs degrading reaction or resin advancement occurs.

The same conditions which lead to lower tensile strength in a viscoelastic liquid lead to lower surface tension and lower viscosity for the liquid. Thus, the same conditions which promote filament separation also promote spreading of the liquid along the filaments. Thus, the conversion in liquid shape depicted in FIG. 5a can be physically realized by manipulating material and operating conditions such that the elasticity of the liquid is minimized. By constraining or preventing the lateral contraction of the filaments towards each other, the length of the neck before fracture, $L_n$, can be minimized. Then thinning of the cross-sectional area, $A_n$, is promoted and the force, $F_n$, required for fracture is reduced. Thus, maintaining a high degree of spreading throughout wetting and solidification promotes separate filament coating. Fracture of the liquid film between filaments can be facilitated by additional forces. Hot gases blown normal to the plane of the spread towpreg fiber substrate will promote interfilament film fracture. A variety of mechanical devices can be introduced to assist filament separation.

In order to produce the towpreg of this invention, substantial wetout of the fibers by the matrix material is desired such that the matrix forming material has been liquefied sufficiently to achieve adhesion to the filaments without the use of a conventional adhesive or binder. Wetout is accomplished typically via a matrix material liquefier, such as a melter or oven, which, through heat, puts the matrix material into a liquid state. To achieve substantial wetout, sufficient residence time in the apparatus selected to put the matrix in a liquid state and to allow the matrix material to sufficiently wetout the fiber is required. There are various liquefiers available, including any of the radiation or conduction ovens. Radiation ovens are preferred for dry powder. Additionally, a hot die can be used in place of an oven.

Since the matrix material is liquefied as part of this invention, it is possible to use any size particles of matrix material powder to coat the filaments, including coarse particles. The liquefaction of the matrix material and the wicking of the matrix material along the filaments reduces the problem of coarse blending between matrix material and filament associated with applying large diameter particles to small diameter filaments. Therefore, the particle size of the matrix forming material in this invention is not critical and can range from the diameter or thickness of the filaments or smaller, which is the generally accepted size in the art for coating, to a diameter or thickness many times larger than that of the filaments, as in the present invention. The use of large diameter or thickness particles of matrix forming material also results in significant cost savings.

2. Preferred Embodiment

The matrix material used comprises substantially recycled waste plastic. Blends of recycled plastics and blends of recycled and virgin plastics also are suitable. Although any type of plastic may be used as the matrix material, thermoplastics are preferred. Plastic to be used as matrix material is first chopped and then ground to provide a powder. This powder can be partially purified by density separation if the source of the recycled waste plastic is a mixed plastic waste, or contains virgin plastic, or both. The powder is applied and fused to a substrate of reinforcing fibers to produce a prepreg. Towpreg and composite structures are fabricated from this prepreg in the same manner as conventional prepreg. Recycled plastic containing towpreg does not have to be flexible to be useful, and the present invention is capable of producing towpregs with a wide variety of flexibility ranges. The combination of the use of any quantity of recycled palstic in the matrix material and reinforcing fibers is inherently useful with any degree of flexibility.

The various fibers which are useful as the fibers or filaments include glass fibers; carbon and graphite fibers; organic fibers, particularly liquid crystal fibers such as aramids and aromatic polyesters which are not low melting; ceramic fibers, such as silicon carbide; hybrid fibers, such as aramid/carbon, aramid/glass, aramid/carbon/glass, and carbon/glass fibers.

In general, fibers with a diameter or thickness greater that 25 microns are not useful. For example, there is no point in using a boron fiber with a diameter of 140 microns as fibers of that thickness cannot be made very flexible. Further, it is preferable to have a fiber which is a reinforcing type fiber and available in continuous form. Suitable fibers should be thermally stable at the temperatures involved in the consolidation step used to make the composite structures. Additionally, suitable fibers must have glass transition and melting temperatures greater than room temperature and melting temperatures greater than the consolidation temperature of the towpreg.

The preferred matrix material is substantially recycled plastic, the remainder being, for example, virgin plastic and/or non-plastic filler. By using recycled plastic, the cost of the matrix is considerably less when compared to other materials, such as those disclosed in this inventor's parent applications, Ser. Nos. 07/339,297 and 07/700,559. Recycled plastics sometimes contain infusible materials which can be embedded in the towpreg product with little harm to the processing equipment or product. The plastic is not melted in an extruder with close tolerances but in a noncontact oven; therefore, infusible material will not harm the processing equipment. Since the properties of the towpreg and composite products are dominated by the reinforcing fibers, a somewhat mixed or contaminated matrix can be tolerated. Thus, by means of this invention, the recycled plastic does not have to be purified to a great extent to achieve suitable towpreg or composite properties.

Different plastics typically are incompatible with each other and therefore mixed plastics typically have low physical properties. Industrial plastic scrap often is segregated and is a preferred source for recycling. Post-consumer plastic is mixed to varying degrees depending on the collection program. For example, mixed in with PET bottles are non-PET bottle caps, paper labels, and "mistakes". Thus, a PET source probably only is about 80% PET. In the past, the other 20% was a problem which led to expensive purification processes. In this invention, a large percentage of the "other" can be tolerated. For example, a typical towpreg may comprise 50% fiber, 40% PET as matrix material, and 10% "other". Since the fibers dominate the properties of the towpreg and any composite made from the towpreg, a comparatively high percentage of "other" can be buried in the towpreg as harmless filler.

Both thermoplastic and thermoset polymers are suitable for use as matrix materials. The prefered recycled plastics are thermoplastics, as the main focus for recycled plastics are the thermoplastics, although other types of plastic may be used. Mixed thermoplastics or combinations of thermoplastics also are suitable for use as the matrix material plastic. Typically, cured thermoset materials without Chemical treatment are used essentially as fillers. Additionally, blends of recycled plastics and virgin plastics may be used, and may be more appropriate for commercial applications. Preferred polymers generally should not be tacky and should have a glass transition or melting temperature greater than room temperature while in service and after curing.

Example classes of polymers are the ABS group, acetals, acrylics, alkyd polyesters, allyls, aminos, epoxies, fluoroplastics, furans, melamines, nylons, phenolics, phenylene oxides and ethers, polyamides, polyamideimides, polybutylenes, polycarbonates, polyesters, polyetheretherketones (PEEK), polyetherketones (PEK), polyetherketoneketones (PEKK), polyetherimides, polyethylenes, polyimides, polymethylpentenes, polyphenylene sulfides, polypropylenes, polystyrenes, polyurethanes, sulfones, ureas, and vinyls. Copolymers, alloys, and blends can be suitable polymer matrices.

Within these classes of polymers specific grades which are not tacky immediately following solidification after the creation of a towpreg are preferred. In addition, thermosetting polymers should not be fully cured when the towpreg is initially solidified in order to permit bonding between the fibers when the towpreg part is finally cured. Additionally, engineering polymers, such as polyetheretherketones, polyamides, epoxies, and polyesters are suitable.

3. Example—Towpregs

Figure 2:
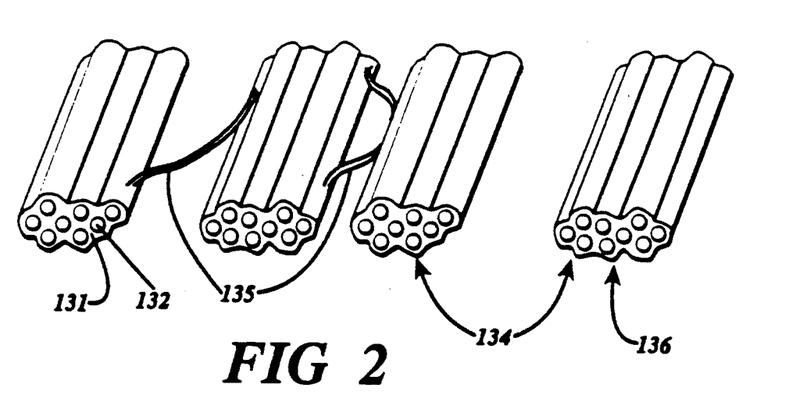
FIG. 2 is a representation of the flexible tow plies produced from the present invention.

With regard to the production of towpregs, after the fibers or filaments have been substantially wetout by the liquefied recycled plastic containing matrix material, the liquefied matrix material generally coats an entire bundle of fibers or filaments. In order to produce a towpreg using this invention, the fibers must be split from each other as shown in FIG. 2 so as to produce individually coated multiple plies within a tow. With reference to FIG. 2, the individually coated multiple plies, represented generally as 134, are composed of reinforcing filaments 132 and matrix forming material 131. Although entirely individual plies 134, such as represented generally by 136, are ideal, the plies 134 can be connected to each other by interply connectors 135, which are generally single filaments 132 coated with matrix forming material 131. These coated plies have a lower flexural rigidity than fully consolidated towpreg.

Figure 3A:
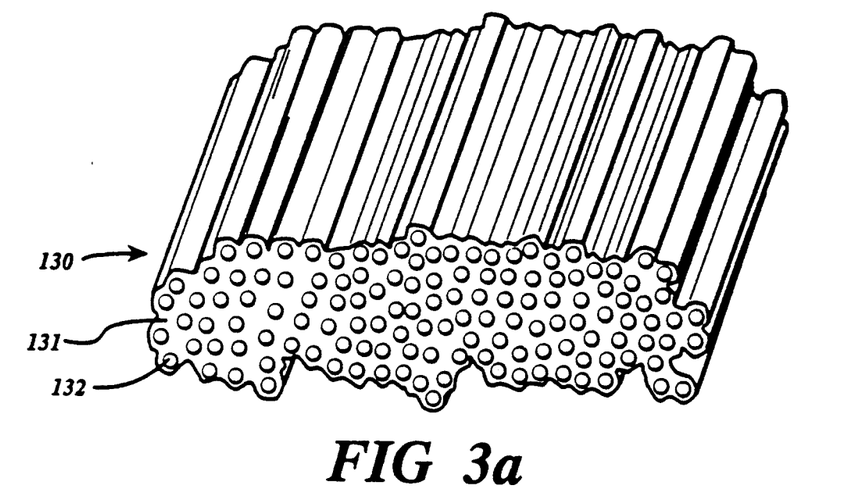
Figure 3B:
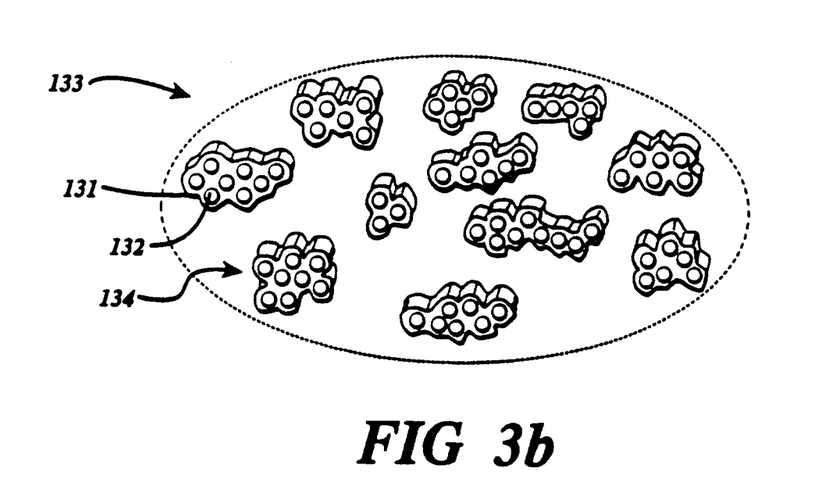
Figure 4A:
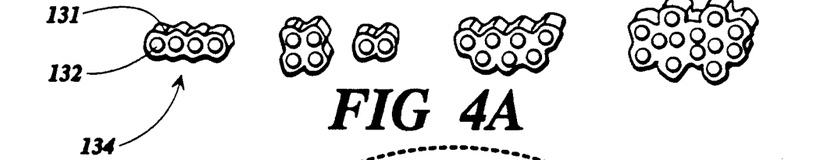
Figure 4B:
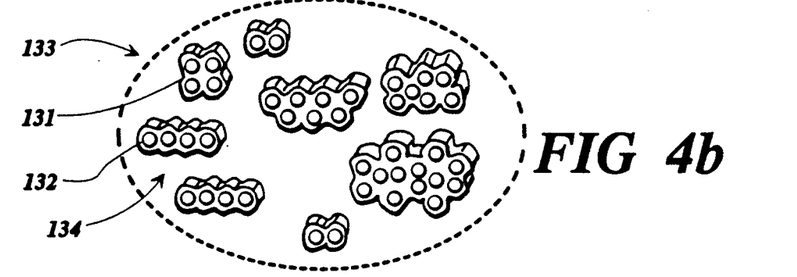

With reference now to FIGS. 3 and 4, in conventional towpreg production, tows containing bundles of generally about 800 to 13,000 filaments 132, each filament 132 having a diameter or thickness of generally about 4 to 16 microns, are converted to towpregs 130 by coating with matrix forming material 131. The conventional process yields a towpreg "ply" 134 of about ⅛ to ¼ inch wide. The term "ply", as used in the conventional process, indicates an individual, conventional single-ply towpreg 130 that can be used alone or with other conventional single-ply towpregs 130 to form composite structures. The "plies" 134 produced from the present invention are individual, substantially wetout bundles of filaments 132, each bundle or "ply" having an average thickness of 100 microns or less and preferably less than 50 microns, which are gathered to form a "multiply" towpreg 133 of any desired thickness.

Figure 6:
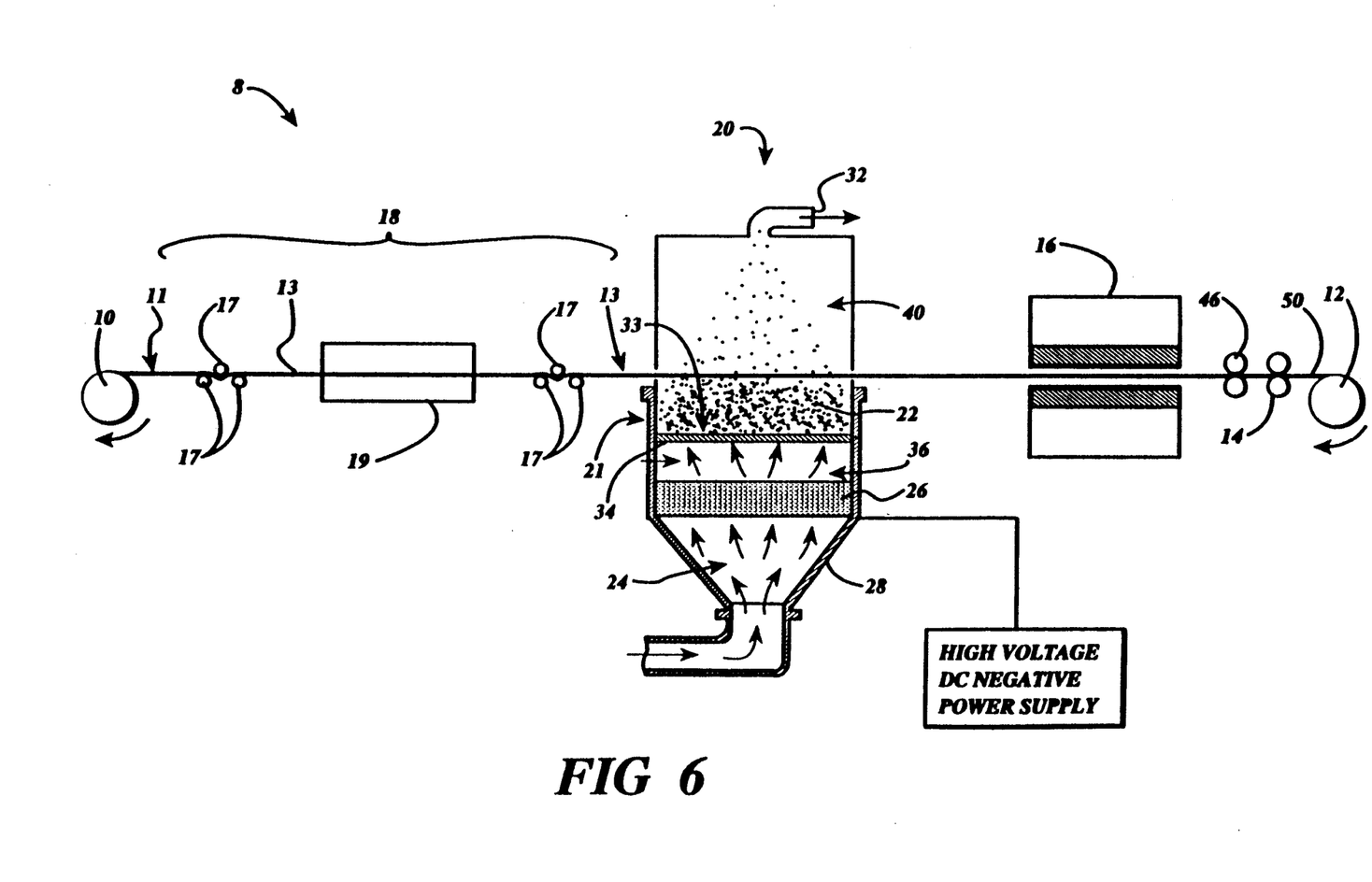
FIG. 6 is an overall schematic of the process of the present invention using an electrostatic fluidized bed.

Splitting occurs if the filaments 132 are well spread by the tow spreader and are held in sufficient tension throughout the process such that the filaments 132 cannot collapse laterally onto each other. Splitting can occur concurrently with wetout in the oven 16 as it generally occurs as the liquefied matrix material 131 wicks longitudinally along the axis of the filament 132. Various alternative methods of splitting can be employed such as the addition of mechanical separators, including grooved rolls, knives, laser cutters, and convection currents perpendicular to the spread tow.

A single towpreg 130 contains several plies 134 which vary in thickness and width. The average thickness of the ply 134 is less than 100 microns and is preferably less than 50 microns. The maximum thickness of the ply 134 is about 100 microns and the minimum height of the ply 134 is the diameter or thickness of an unimpregnated fiber 132 used as the reinforcing filament in the ply 134. Typically, the length of a ply 134 is greater than the width of a ply 134 and both the length and width of a ply 134 are greater than the thickness of a ply 134. Generally the thickness of a ply 134 is much less than the width of a ply 134, which is generally less than 2000 microns. Additionally, the average length of a ply 134 is preferably greater than 30 times the thickness of a ply 134.

4. Characteristics of Towpregs

ASTM D 1388 is a standard test method used to determine the stiffness of fabrics and also can be used to characterize the stiffness of the towpregs. Generally, a standard sample is 1 inch wide; however, measurements can be made on samples less than 1 inch wide, as long as the results are corrected for this difference. ASTM D 1388 is incorporated herein by reference.

A standard thermoplastic prepreg, such as APC 2 made by ICI, is 5 mils or 127 microns thick and has a flexural rigidity estimated to be 216,000 mg-cm. A towpreg with this flexural rigidity is very difficult to weave or braid. Thus, for weaving or braiding applications, a thinner towpreg is preferred; that is, a multiply towpreg with an average ply thickness less than about 50 microns. Such towpregs are produced by this invention.

Flexibility is important for weaving fabrics. The cantilever test method, ASTM D 1388-64 (1975), incorporated herein by this reference, is used to calculate the flexural rigidity by measuring the bending length of the towpregs. Bending length is a measure of the interaction between the weight of the towpreg and its stiffness as indicated by the way in which the towpreg bends under its own weight. It reflects the stiffness of the towpreg when bent in one plane under the force of gravity, and is one component of drape.

The maximum elastic strain in the coated fiber is at its surface. Reinforcing fibers typically cannot withstand compressive strains beyond 0.3% without buckling. For an elastic ply this strain can be related to the ply thickness and minimum bending radius through the following expression:

$$h = 2 R_{min} e$$

where:
$h$ = the ply thickness
$R_{min}$ = ply bending radius
$e$ = *maximum allowable surface strain.*

For example, a towpreg fabric subjected to a minimum bending radius of 10 mm and a maximum allowable strain of 0.3% cannot be more than 60 microns thick. The minimum bending radius depends on the part geometry and the maximum strain depends on the reinforcing fiber. Thus, the thickness of the towpreg fabric depends on both the material and application.

5. Producing Towpregs

Figure 1:
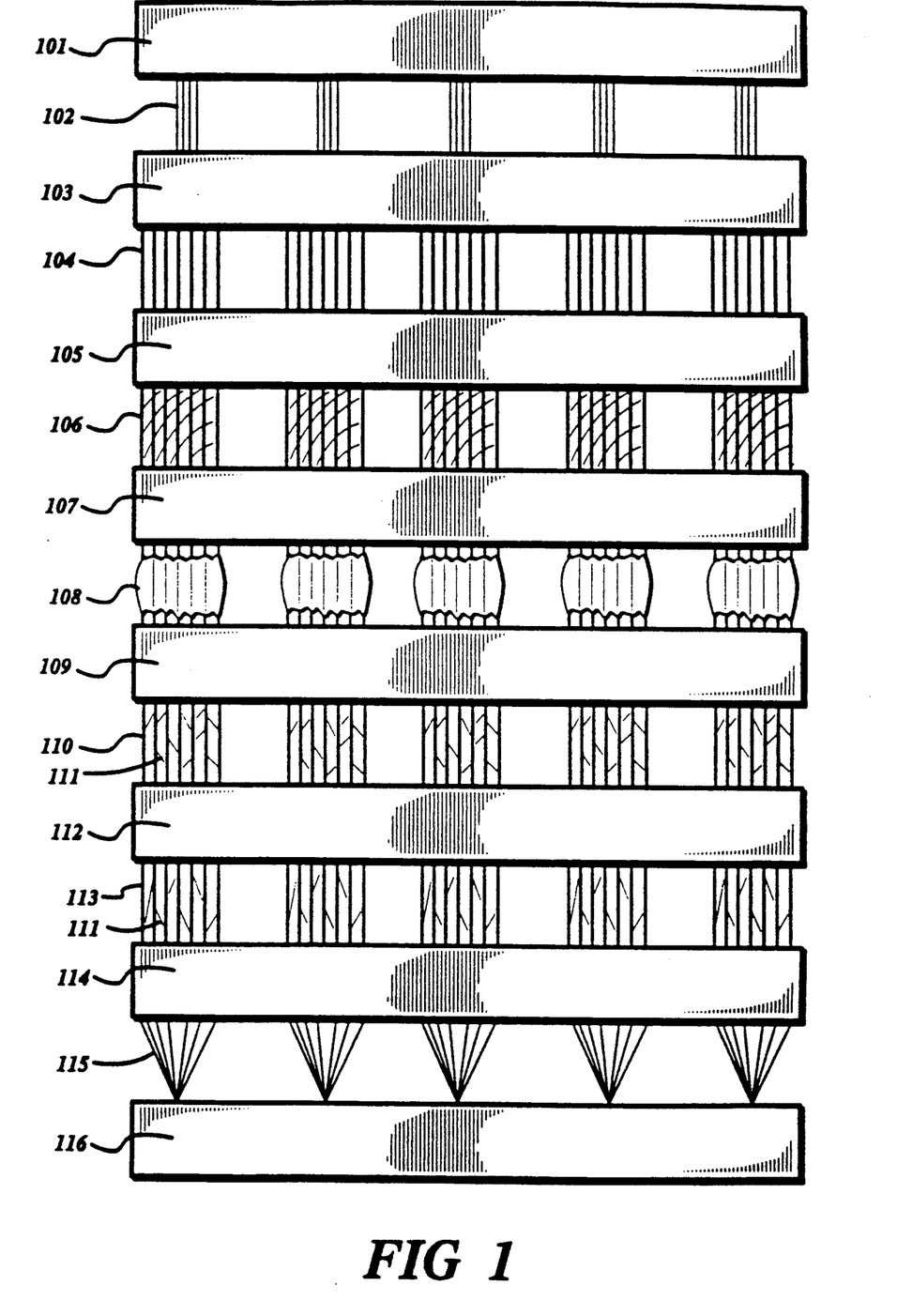
FIG. 1 is an overall flow diagram of the process of the present invention for producing towpreg.

The method of this invention for producing a towpreg is shown in a simplified flow process chart in FIG.

1. The fiber tow 102 is supplied during the let-off step 101, which can be bobbins or spools of fibers, fibers from an upstream process, or from any other supply. The fiber tow 102 consists of many individual filaments 104, for example carbon fibers having diameters of about 8 microns, which are spread or separated from each other, so as to form a lateral spread of individual filaments 104, in the spreading step 103. A spread of about 2 inches is typical. The now spread filaments 104 are coated with the recycled plastic containing matrix forming material during the coating step 105. After the filaments 104 are sufficiently coated 106 with matrix forming material, the matrix forming material is liquefied in wetout step 107, forming sufficiently wetout fiber tow 108.

As the liquefied matrix forming material wicks down the filaments 104, the thickness of the matrix forming material becomes thinner until the thin film fractures between filaments 104 (see FIG. 5) during the splitting step 109. The now coated filaments 110, either individually or in bundles, are cooled in the cooling step 112 where the matrix forming material solidifies. During the cooling step 112, groups of filaments 110 form individual plies 113. Sometimes individual filaments 110 link neighboring plies 113 as interply connectors 111 during the cooling step 112. The plies 113 are pulled by a pulling means 114 so as to keep the fiber tow 102 moving and to place axial tension on the filaments 104 so the individual filaments 104 do not collapse upon themselves, thus forming a mass of filaments and matrix material. The plies 113 optionally can then be gathered together 115 to form various thickness towpregs, which are then wound in winding step 116.

6. Preferred Apparatus

Referring now to FIG. 6, the fiber tow 11 supplied on let-off wheel 10 is drawn through the apparatus 8 and secured to take-up wheel 12. The take-up wheel 12 is rotated at a variable speed and the let-off wheel 10 is not driven. Typical linespeeds are 10 to 100 feet per minute. Slower speeds are feasible but are not economically attractive, for a number of reasons including, for example, less towpreg produced per time unit and the chance that the matrix forming material will be destroyed through degradation or resin advancement due to increased over residence time. Higher speeds can be achieved provided tow supports are installed to minimize tow vibration, the matrix applicator is long enough to insure sufficient matrix is applied, and the oven is long and hot enough to liquify the matrix. Line speeds above 100 feet per minute are feasible in some cases uner proper conditions. Intermediate pinch rollers 14 are used to pull the fibers 11 as they come out of the oven 16. A constant tension winding on take-up wheel 12 is maintained by adjusting the winder motor (not shown) speed with a tension controller (not shown). The fiber speed through the apparatus 8 can be controlled by adjusting the speed of the pinch rollers 14.

The fiber tow let-off is taken directly from bobbins of wound fibers. The fiber tow also can come directly from upstream processes. During let-off, it is important to avoid twisting the filaments 13 making up the fiber tow 11 as twisted filaments 13 are more difficult to separate. Additionally, it is helpful to control the tension on each individual bobbin of fibers to keep the line tension constant throughout the impregnation process. A guide plate (not shown) may be placed between the let-off mechanism and the fiber spreader 18 to aid in guiding the fibers through the spreader 18.

The spreader 18 uses a series of rollers 17 and an air comb 19 to spread the fiber tow 11 to expose individual filaments 13. The rollers 17 are arranged in two groups; one group located just before the air comb 19 and one group located just after the air comb 19. The two main purposes of the rollers 17 are: (1) to provide tension to the fibers thus reducing the amount of lateral collapse of the fibers onto themselves during the process; and (2) to reduce the vibration of the fibers. The rollers 17 can be made of any material and have any surface characteristics; however, smooth Teflon rollers are preferred as they provide for good spreading of the fibers. At least one of the rollers 17, preferably the one immediately before the coating system 20, must be made of a conducting material, stainless steel being preferred, so as to ground the fibers 11 before they enter the coating system 20. The air comb 19 already is known in the art.

The fiber tow 11, after leaving the let-off wheel 10, enters the first group of rollers 17 where the filaments 13 are spread. The configuration of this first group of rollers 17 allows the fiber tow 11 to weave through the first group of three rollers 17, passing over the first roller, under the second roller and over the third roller, helping to impart a constant tension on and to reduce the vibration of the tow filaments 13. The fiber tow 11 then enters the air comb 19 where forced air further spreads the filaments 13. After leaving the air comb 19, the fiber tow 11 enters the second group of rollers 17 where the filaments 13 are further spread. The configuration of this second group of rollers 17 is similar to the configuration of the first group of rollers 17 for the same reasons. As mentioned previously, it is preferred that the final roller in this second group of rollers be made of a conducting material so as to ground the fibers prior to entering the coating system 20.

Various other spreader 18 means are available, including smooth, grooved or crowned rollers or drums; air combs; a combination of air combs and rollers or drums; air banding jets; ultrasonic spreaders, and liquid baths. Of prime concern in choosing tow spreading means is that the means chosen will spread the fibers into a columnated tape preferably only one filament thick and that the method will not damage the fibers or filaments.

Additional subprocesses may be included between the spreader 18 and the coating bed system 20 as required in the various applications. For example, equipment for desizing, surface activation and the application of adhesion promoters may be desired to produce a towpreg desired for a specific application.

The filaments 13 next enter a coating system 20 where the matrix material is applied to the filaments 13. As the filaments 13 enter and pass through the coating system 20, the spread of the filaments 13 is maintained. Many different coating systems 20 are useful and are discussed as examples below. Powder spray coating systems and electrostatic fluidized bed systems are preferred, powder spray coating systems typically being less costly to operate. Various other coating systems 20, such as wet powder, hot melt, and solution coating also can be used.

a. Fluidized Bed

The fluidized bed coating system 20, in its simplest embodiment, comprises an enclosure 21 within which the matrix material powder 22 is confined. By a combination of air flow 24 and mechanical vibration, the powder 22 is fluidized and simultaneously electrically charged by means of high voltage electrodes 26 situated at or near the base of the container 28. The electrode 26 may consist of sharp points or, more usually, small diameter wires. At the top of the coater enclosure 21 there is an open port 32 to allow the escape of the fluidizing air 24.

Passing the towpreg fiber substrate over and under rollers connected to a metal frame is one procedure to simultaneously ground and spread the fibers. With greater spreading, more powder can be picked up and greater flexibility of product results because the substrate is thinner. When the fibers are not spread prior to coating, the towpreg emerges in a brittle state and the fibers within the towpreg are not totally coated.

The powder particles 22 are uniformly dispersed in the container 28. For electrostatic coating, a preferred particle size range is about 20 to about 80 microns, with an average particle size of about 50 microns. Flexible towpreg has been produced from both finer and coarser powders. Particles less than about 20 microns have been applied successfully, although it is likely that these fine powders, especially those less than about 10 microns, agglomerate into larger particles in the fluidized bed. Coarse particles up to about 250 microns have been applied, but the flexibility of the towpreg is reduced as the size of the applied powder is increased. Since recycled plastic powders are most conveniently obtained by grinding and the cost of grinding increases as the average particle size is reduced, it is preferable to select coarse powder. The coarseness of the powder must be counterbalanced by the flexibility and extent of mixing desired in the towpreg for downstream processing. Porous plate 34 provides for a very high resistance to travel of air 24 through the plate 34 while permitting passage of sufficient air 24 at low velocity to fluidize the powder 22. The mechanical vibration of the porous plate 34 is used to enhance fluidization and to reduce the possibility of air channeling and powder clumps. The depth of powder material 22 in the bed 33 is usually two to four inches (50 to 100 mm).

In the fluidized bed system 20, individual particles of the powder 22 adhere electrostatically to the fibers. The charged particles of powder 22 repel each other to such a degree that they rise above the chamber container 21 forming a cloud 40 of charged particles, through which the fibers are passed. In this example, a model C30 electrostatic fluidized bed coater from Electrostatic Technology Incorporated is used. The bed dimensions are 6×6 inches. The electrical output is 0–90 kv and the air input is 0–12.5 standard cubic feet per minute (SCFM). The fluidized bed system 20 also incorporates an ionized air system 36 created by charging electrodes 26 below the fluidized bed 33 to prevent the unintentional ignition of the fluidized powder 22 by electrical sparking.

The fluidizing air 24 must be dry and clean because contaminants within the air supply would result in blocking the porous plate 34 and uneven fluidization. Moisture in the air causes the powder 22 to pack on the fluidized bed 33, causing reduced fluidization efficiency. Normally dry air 24 at a pressure of 30 to 80 psi supplied at a rate of approximately 5 cu.ft./min per square foot of diffuser plate 34 is appropriate. The fluidized powder 22 is maintained in the fluidized state by controlling the air flow 24. A typical method for drying the fluidizing air 24 is to use a cylindrical chamber (not shown) filled with silica gel, such as Drierite. Alternatively, the air can be dried by refrigeration. Wet air enters the dryer and moves through a mesh screen into the silica gel. Moisture is separated out in the chamber. Dry air 24 then flows through the outlet to the fluidized bed 33.

The voltages employed in the fluidized bed system 20 are usually between about −30 to about −100 kV. In most cases, negative polarity is used. The output voltage should be approximately −100 kV maximum and the maximum output energy when the system 20 is shorted to ground must not be greater than the ignition energy of the particular materials 22 being applied. The high voltage required depends on the powder being used and generally ranges from about −35 to about −90 kV.

A vacuum exhaust system (not shown) is positioned to collect and return the excess coating powder to the powder supply reservoir (not shown). A typical exhaust system consists of one or more cyclones or bag filters (not shown), or a combination of both. Top exhaust, entrance and exit port exhaust or perimeter exhaust are all techniques that can be applied. The velocity of exhaust air should be about the same as the velocity of the inlet air flow 24. In this example, the exhaust system employs a cartridge type exhaust to recover powder by collecting the powder in a vacuum bag filter. Powder is drawn to the cartridge by air suction, and then recovered by shaking the pocket or the bag filter inside the cartridge.

Typical residence times in the powder coating chamber are from about 1 to about 5 seconds. This time depends on the type of fiber, the extent of fiber spreading, the type of plastic, the particle size, the coater operating conditions (e.g., air flow, electrostatic charge), and the amount of matrix sought in the towpreg.

The coated fiber next enters the oven 16, preferably as soon as it leaves the fluidized bed system 20, in order to melt the powder 22 onto the fibers before the decay of charge or charge relaxation occurs and the powder falls off the fibers. The oven 16 temperature depends on the fiber and the powder 22. However, oven 16 temperature and residence time within the oven 16 or heater 70 should be set to insure that the decomposition temperature of the powder 22 resin is not achieved for the residence time the coated fibers are in the oven 16 or heater 70. The oven temperature should be sufficiently high to melt the highest temperature plastic present.

Typically in post-consumer plastic recycling, PET is the highest melting palstic. Since PET melts near 250° C., an oven setting at least the melting temperature of PET, about 250° C., and preferably 300° C. or more, is desired. In order to reduce the oven residence time and enhance wetout, much higher oven temperatures can be used since the material temperature does not reach the oven temperature. When the oven temperature is above about 400° C., which will cause most recycled plastics to degrade given sufficient residence time, provision must be made to remove Powder which drops off of the tow into the oven. Without this provision, the potential for creating a fire is increased. The coated fibers can be heated by either convection or radiant heating. In this example, the oven 16 is a Lindberg single zone tube furnace, which has a maximum operating temperature of 1200° C., is 30 inches in length, and has an inside diameter of 2 inches. Typical residence times in the oven for the towpreg are about 2 to about 20 seconds. In most cases, a residence time of less than about 10 seconds is adequate for liquefying and fusing the plastic to the fibers. For viscous melts, like high molecular weight polyethylene, longer times may be required to promote wicking along the fibers.

b. Powder Spray Coating

Powder spray coating of the fibers by the matrix material particles can be accomplished using an electrostatic spray gun. In its simplest design, an electrostatic spray gun is a tube with a charging electrode attached to a high-voltage generator. Powder particles are directed through the gun tube, typically by a forced air flow, and charged by the electrode. The charged powder particles are directed at the substrate, in this case the fibers, where they adhere to and coat the substrate. The substrate is grounded such that an opposite charge relationship is created between the charged powder particles and the substrate.

In the present invention, the electrostatic spray gun, which is contained within a powder chamber, which replaces the fluidized bed. The fibers leave the spreader and enter the powder chamber. Matrix material powder is fed to the spray gun where it is charged and directed at the fibers, which are grounded. Some charged powder particles adhere to and coat the fibers, while the remainder is recycled to the spray gun. The coated fibers exit the powder chamber and proceed to the oven.

The air flow through the spray gun, the powder flow input, and the electrostatic control are all variable and values are selected based primarily on the fiber and matrix material being used. For example, using a Ransburg-Gema AG unit type 701-6 electrostatic spray gun to coat 12K carbon fibers spread to 2 inches with less than 150 micron nylon 11 powder with some carbon black pigment, various settings can be used to accomplish coating. The Ransburg-Gema unit allows an air flow "level" of 0-7, a powder flow "level" of 0-10, and an electrostatic setting of 0-−80 kV. The following Table I presents coating parameters and values.

TABLE I

| | | Coating values | | |
|---|---|---|---|---|
| Line Speed (ft/min) | Air Flow Level | Powder Flow Level | Electrostatic Setting (−kV) | % Matrix By Weight |
| 11.8 | 1.5 | 4.5 | 25 | 34.8 |
| 20.7 | 2.0 | 6.0 | 15 | 41.00 |
| 27.5 | 2.0 | 10.0 | 7 | 43.5 |
| 45.5 | 2.0 | 10.0 | 7 | 30.0 | c. Wet Powder Coating

In wet powder coating, the matrix material is a wetted powder, such as slurry or emulsion coating. In wet powder coating, there is no need to ground the fibers prior to entering the coating system; therefore, the stainless steel roller mentioned above is not necessary. After leaving the spreader 18, the fibers are drawn through an optional primer for applying an adhesion promoter.

After leaving the primer, the fibers travel into the wet powder coating system proper which comprises a roll coater, a wet powder or emulsion reservoir, and a slurry pump. The matrix material powder is suspended in a liquid medium that can be either water or solvent based. The water based medium includes water and, possibly, a water soluble binder, and the solvent based medium contains a solvent and a dissolved binder. The fibers travel over the top surface of the roll coater that rotates generally in a direction complimentary to the direction of fiber travel. The lower surface of the roll coater contacts the slurry or emulsion in the reservoir and becomes coated with the slurry or emulsion. As the roll coater rotates, it brings the slurry emulsion to its top surface where it contacts and coats the traveling fibers. The slurry pump maintains the slurry or emulsion in a uniform concentration.

The coated fibers leave the roll coater area and enter a drier where the water or solvent are evaporated from the slurry coating the fibers. The water soluble binder may be removed provided the resin is fused to the fibers. The now dry fibers leave the drier and enter a melter where the matrix material is liquefied and wets the fibers. An alternative to using a roll coater in the wet powder coating system is to draw the fibers directly through the slurry or emulsion itself. After being drawn through the slurry or emulsion, the fibers then travel directly to the drier.

d. Hot Melt Coating

A hot melt system typically comprises a roll coater or an extruder and die. The hot melt system utilizes the roll coater, and operates in the same manner as the wet powder coating system described above, with the exception that the slurry or emulsion reservoir is replaced with a melt reservoir containing the hot melt of the matrix material. As in the wet powder coating system, the roll coater is optional as the fibers can be drawn directly through the hot melt reservoir.

The hot melt coating system utilizing the extruder and die operates by pulling the spread fibers through a slit die supplied with hot melt by an extruder. The matrix material coats the fibers in the die. Fiber wetout starts as soon as the hot melt of the matrix forming material contacts the fibers. Therefore, an oven to accomplish further wetting may not be necessary.

e. Solution Coating

Solution coating systems utilize various solvents. In this system, the matrix material is dissolved in an applicable solvent and the fibers are drawn through this matrix material/solvent solution or over a solution coated roller so as to coat the fibers. The coated fibers are then passed through a drier to evaporate the solvent.

7. Post-Coating Treatment of Towpregs

After the fibers have been wetout by the recycled plastic matrix forming material in the coating system 20, the towpreg 50 can be passed through an optional set of polishing rollers 46. These rollers 46 can be located within the oven 16 or just after the exit of the oven 16, but, in any event, the rollers 46 must be located in a position on the apparatus 8 where the matrix forming material is still in the liquid state. The purposes of the polishing rollers 46 are to force the still liquid matrix forming material into the fibers to help achieve better wetout and to reduce the surface friction due to droplets of matrix forming material being left on and solidifying on the surfaces.

After leaving the oven 16, the towpreg 50 cools rapidly. Typically, air cooling is sufficient, although the use of blowers, cold rollers and the like may be advantageous in certain situations. During cooling, it is important that the fibers remain in sufficient tension such that the individual fibers do not collapse onto each other and result in a mass of fibers and matrix material, which will result in a towpreg of high flexural rigidity. Also, it is important to not let the fibers within the towpreg solidify in contact with each other, thus leading to a strong interfiber bond. An optional convective cooling method (not shown) located after the oven 16 would help keep the fibers separated. Conductive cooling methods may be used as they require surface contact, which constrains the lateral motion of the substrate. Towpregs typically must contain over about 25% matrix material by volume so as to form a sufficiently void-free composite structure suitable for processing into final composite structures.

The main purpose of the pinch rollers 14 is to drive the fiber substrate 11 through the process and to keep sufficient tension on the fiber substrate 11 to prevent the fiber substrate 11 from laterally collapsing onto itself. The various devices useful for pulling include driven pinch rollers, preferably rubber coated, and friction rollers, also preferably rubber coated. The take-up or wind-up device 12 can be any of the known typical tow winders with a tension control. Alternatively, the towpreg 50 may be fed directly to downstream processes such as a chopper to produce sheet or bulk molding compound feedstock.

The above description has been offered for illustrative purposes only, and is not intended to limit the scope and equivalents of the present invention, which is as defined in the claims below.

What is claimed is:

1. A method for the production of a composite article comprising a plurality of multiply towpregs, comprising towpreg plies, said towpreg plies comprising reinforcing filaments and matrix forming material comprising recycled plastic, comprising the steps of:
   (a) spreading said reinforcing filaments to expose individually substantially all of said reinforcing filaments;
   (b) coating said reinforcing filaments with said matrix forming material in a manner causing interfacial adhesion of said matrix forming material to said reinforcing filaments;
   (c) forming said towpreg plies by heating said matrix forming material contacting said reinforcing filaments until said matrix forming material liquefies and coats said reinforcing filaments;
   (d) cooling said towpreg plies in a manner such that substantial cohesion between neighboring towpreg plies is prevented until said matrix forming material solidifies so as to form said multiply towpregs; and
   (e) configuring said multiply towpregs into said composite article.

2. The method as claimed in claim 1, wherein said matrix forming material further comprises virgin plastic.

3. The method as claimed in claim 1, wherein said matrix forming material consists essentially of recycled plastic.

4. The method as claimed in claim 2, wherein said matrix forming material is first chopped and then ground to provide a powder prior to coating said reinforcing filaments.

5. The method as claimed in claim 4, wherein said spreading of said reinforcing filaments is lateral and is maintained by axial tension on said reinforcing filaments.

6. The method as claimed in claim 5, wherein said spreading results in a band one reinforcing filament thick.

7. The method as claimed in claim 6, wherein said powder comprises particles whose average diameter is greater than the average diameter of said reinforcing filaments.

8. The method as claimed in claim 7, wherein said powder comprises particles whose average diameter is greater than four times the average diameter of said reinforcing filaments.

9. The method as claimed in claim 1, wherein said matrix forming material consists essentially of a blend of plastics.

10. The method as claimed in claim 1, wherein said matrix forming material consists essentially of one type of recycled plastic.

11. The method as claimed in claim 1, wherein said filaments have an average diameter no greater than 25 microns.

12. The method as claimed in claim 1, wherein said filament is selected from the group consisting of glass fibers, carbon fibers, graphite fibers, organic fibers, ceramic fibers, and hybrid fibers.

13. The method as claimed in claim 1, wherein said heating occurs at a temperature which is as high as said matrix forming material will take without undergoing degradation.

14. The method as claimed in claim 1, wherein said reinforcing filaments are substantially wetout by said matrix forming material.

15. The method as claimed in claim 1, wherein said towpreg plies have an average length greater than their average width.

16. The method as claimed in claim 1, wherein the matrix forming material content of said towpreg plies is more than 25% by volume.

17. The method as claimed in claim 1, wherein said towpreg plies have an average thickness of less than about 100 microns.

18. The method as claimed in claim 17, wherein said towpreg plies have an average thickness of between about 10 and about 50 microns.

19. A method for the production of a composite article comprising a towpreg, said towpreg comprising reinforcing filaments and matrix forming material comprising recycled plastic, comprising the steps of:
   (a) supplying a quantity of said reinforcing filaments;
   (b) forming a lateral spread of said reinforcing filaments;
   (c) coating said reinforcing filaments with said matrix forming material;
   (d) liquefying said matrix forming material on said reinforcing filaments so as to wetout said reinforcing filaments;
   (e) splitting said coated reinforcing filaments from each other;
   (f) cooling said coated reinforcing filaments to produce said towpreg; and
   forming said towpreg into a composite article.

20. The method as claimed in claim 1, wherein said coating is accomplished by a powder spray coating means.

21. The method as claimed in claim 1, wherein said coating is accomplished by an electrostatic fluidized bed coating means.

* * * * *